United States Patent [19]

Kikuta et al.

[11] 4,287,328

[45] Sep. 1, 1981

[54] METHOD FOR PRODUCING α-OLEFIN POLYMERS

[75] Inventors: Kazutsune Kikuta; Masami Tachibana, both of Ichiharashi; Akihiro Sato, Chibaken, all of Japan

[73] Assignee: Chisso Corporation, Osaka, Japan

[21] Appl. No.: 22,613

[22] Filed: Mar. 21, 1979

[30] Foreign Application Priority Data

Dec. 1, 1978 [JP] Japan ................................ 53-148728

[51] Int. Cl.³ .......................... C08F 4/02; C08F 10/06
[52] U.S. Cl. ................................ 526/115; 252/429 B; 252/429 C; 525/247; 526/97; 526/114; 526/116; 526/121; 526/122; 526/124; 526/125; 526/348.6; 526/351
[58] Field of Search .................. 526/97, 114, 115, 121, 526/122, 124, 125; 525/247

[56] References Cited

U.S. PATENT DOCUMENTS

| 3,900,454 | 8/1975 | Sato et al. | 526/124 |
| 4,027,087 | 5/1977 | Satoh et al. | 526/124 |
| 4,103,078 | 7/1978 | Sato et al. | 526/124 |

FOREIGN PATENT DOCUMENTS 2739608  3/1978  Fed. Rep. of Germany ........... 526/125

*Primary Examiner*—Edward J. Smith
*Attorney, Agent, or Firm*—Fred Philpitt

[57] ABSTRACT

A method for producing α-olefin polymers is provided. According to this method, particularly the catalyst stability is improved, resulting in polymers having a higher crystallinity, a narrower range of molecular weight, improved shape of polymer particles with a higher yield per a solid product component and per a transition metal component of the catalyst. Said catalyst is obtained by reacting a trivalent metal halide with a hydroxide, an oxide, a carbonate of a divalent metal, a double compound containing any of these compounds or a hydrate of a compound containing a divalent metal to form a solid product (I); reacting said solid product with one or more electron donors and one or more electron acceptors separately or simultaneously each in one to 10 steps but using $TiCl_4$ as said acceptor(s) in at least one step to obtain a solid product (II); and then combining said solid product (II) with an organoaluminum compound and an electron doner, but before being used in polymerization, at least one part or the whole of said catalyst components is subjected to a polymerization-treatment with an α-olefin in the coexistence of at least both of said solid product (II) and said organoaluminum compound to form a preliminarily activated catalyst.

16 Claims, No Drawings

METHOD FOR PRODUCING α-OLEFIN POLYMERS

DESCRIPTION OF THE INVENTION

The present invention relates a method for producing highly crystalline α-olefin polymers having an improved shape of polymer particles with a high yield, by using a catalyst having a higher stability of catalyst activity.

We have so far developed as catalysts for polymerizing ethylene or α-olefins including ethylene, those having a transition metal compound carried, in various manners, on a solid product obtained by reacting a trivalent metal halide with a divalent metal compound.

For example, we proposed (1) a method in which a transition metal compound is reacted with the above-mentioned solid product in the presence of an aromatic compound (Japanese patent publication Nos. 13609 of 1972, 16782 of 1974, etc.); (2) a method in which a transition metal compound is reacted with a product obtained by reacting the above-mentioned solid product with a polysiloxane or an electron donor (Japanese patent publication No. 13827 of 1977 and Japanese patent application No. 127750 of 1977); (3) a method in which reaction is carried out by adding to the above-mentioned solid product, a polysiloxane or an electron donor compound and a transition metal compound simultaneously or by adding a complex of a polysiloxane with a transition metal compound or a complex of an electron donor with a transition metal compound (Japanese patent publication No. 21246 of 1978, No. 21247 of 1978, No. 32031 of 1978, etc.); (4) a method in which an electron donor or an electron acceptor is reacted with the above-mentioned solid product in a plurality of steps (Japanese patent application No. 101960 of 1978); and (5) a method in which the above-mentioned solid product is reacted with an electron donor and an electron acceptor, and at that time, TiCl$_4$ is used as an electron acceptor in at least one step and the resultant solid catalyst component is combined with an organoaluminum compound and an electron donor to use the resultant combination as a catalyst for polymerization (Japanese patent application No. 106797 of 1978). We also proposed (6) a method in which various additives such as titanium alkoxide, silicone oil, polyethylene glycol dialkyl ether or other electron donor are added (Japanese patent publication No. 13609 of 1972, No. 13772 of 1972, etc.).

These inventions are superior in the points that polymer yield per catalyst component is very high, and they provide polymers of α-olefins such as propylene or the like, having higher crystallinity and good shape of polymer particles, and further in case of the above-mentioned inventions (5) and (6), the distribution of molecular weight can be controlled in a narrow range. However, the stability of catalyst has been not always sufficient in case of the above-mentioned invention (5).

The stability of catalyst referred to herein means that (i) even when a catalyst for polymerizing α-olefins, prepared by combining the catalyst components together, was allowed to elapse over several hours to several days before polymerization is initiated by feeding an α-olefin in the presence of the catalyst, (such a lapse of time being often encountered in case of actual practice of polymerization operation), reduction in the catalyst performance such as polymerization activity of catalyst, capability of increasing the crystallinity of the resulting polymer and capability of improving the shape of particles of polymer, is few; (ii) even when a long time polymerization is carried out, reduction in the catalyst performance on account of change of catalyst properties with lapse of polymerization time is few; and (iii) the dispersion of catalyst performance brought by the small differences in the concentrations of the respective catalyst components as well as in the proportions of the respective catalyst components at the time of catalyst preparation is few, to give a good reproducibility.

In case of the above-mentioned invention (5) made by us, however, reduction in the catalyst performance in respect of the above-mentioned points (i), (ii) and (iii) has been observed.

An object of the present invention is to provide a method for producing α-olefin polymers with a catalyst having an improved stability in order to overcome the above-mentioned drawback.

The present invention resides in the following matter:

In the method for producing α-olefin polymers by polymerizing α-olefins in the presence of a catalyst obtained by reacting a trivalent metal halide with hydroxide, oxide or carbonate of a divalent metal, a double compound containing any of these compounds or hydrate of a compound containing a divalent metal (the foregoing compounds being hereinafter referred to as divalent metal compound), to form a solid product (I);

reacting said solid product (I) with one or more electron donors and with one or more electron acceptors, separately or simultaneously, each in one step to ten steps, and titanium tetrachloride being used as said electron acceptor(s) at least once, to form a solid product (II); and combining this solid product (II) with an organoaluminum compound and an electron donor (these three substances used in this combination being hereinafter referred to as catalyst components), the improvement which comprises, in the preparation of said catalyst by combining said catalyst components together, subjecting a part or the whole of said catalyst components to a polymerization-treatment with an α-olefin in the coexistence of at least both of said solid product (II) and said organoaluminum compound, to form a preliminarily activated catalyst, and then polymerizing α-olefins by using said preliminarily activated catalyst.

The catalyst components used in the method of the present invention are as follows:

(A) Trivalent metal halide
(B) Divalent metal compound (a hydroxide, an oxide, a carbonate of a divalent metal, a double compound containing any of these compounds or a hydrate of a compound containing a divalent metal)
(C) An electron donor
(D) An electron acceptor
(E) An organoaluminum compound
(F) An α-olefin A method for preparing the catalyst used in the present invention will be described.

The solid product (I) is obtained by reacting a trivalent metal halide with a divalent metal compound.

As trivalent metal halide, aluminum trichloride (anhydrous), aluminum tribromide (anhydrous), ferric trichloride (anhydrous), etc. are used.

As divalent metal compounds, hydroxides such as $Mg(OH)_2$, $Ca(OH)_2$, $Zn(OH)_2$, $Mn(OH)_2$ and the like; oxides such as MgO, CaO, ZnO, MnO and the like; double oxides containing a divalent metal oxide such as $MgAl_2O_4$, $Mg_2SiO_4$, $Mg_6MnO_8$ and the like, divalent metal carbonates and double carbonates containing a divalent metal carbonate such as $MgCO_3$, $MnCO_3$ and $MgCO_3.CaCO_3$; hydrates of halides such as $SnCl_2.2H_2O$, $MgCl_2.nH_2O$ (n=1~6), $NiCl_2.6H_2O$, $MnCl_2.4H_2O$, $KMgCl_3.6H_2O$; hydrates of double compounds consisting of a halide and a hydroxide such as $MgCl_2.nMg(OH)_2.mH_2O$ (n=1~3, m=1~6); hydrates of double oxide such as $3MgO.2SiO_2.2H_2O$; hydrates of a double compound consisting of a carbonate and a hydroxide such as $3MgCO_3.Mg(OH)_2.3H_2O$; hydrates of a hydroxide-carbonate containing a divalent metal such as $Mg_6Al_2(OH)_{14}CO_3.4H_2O$ can be mentioned. Among these, divalent metal compounds containing magnesium are most preferable.

As for method for producing a solid compound (I), (1) a method in which a trivalent metal halide and a divalent metal compound are reacted while being milled in a milling apparatus such as a ball mill, a vibrating mill or the like, (2) a method in which a trivalent metal halide and a divalent metal compound are milled and mixed and then reacted on heating, and the like, can be mentioned. The ratio of the amounts of a divalent metal compound to a trivalent metal halide will be sufficient if 0.1~20 mol of a divalent metal compound is used per 1 mol of a trivalent metal halide. In case of reaction carried out under milling, the condition of milling reaction will be sufficient if a temperature is in the range from room temperature (about 20° C.) to 500° C., a time is 5~100 hours for a ball mill and 10 minutes to 50 hours for a vibrating mill. In case of heating after milling, milling is carried out for 5 to 100 hours for a ball mill and 10 minutes to 50 hours for a vibrating mill and then heating is carried out at a temperature from room temperature to 500° C. for 10 minutes to 50 hours. The solid product thus obtained will be used as a solid product (I).

The solid product is then reacted with an electron donor (C) and an electron acceptor (D).

The electron donors used in the present invention include organic compounds containing oxygen, nitrogen, sulfur or phosphorus.

The electron donors include e.g. esters (the general formula of RCOOR', wherein R and R' are hydrocarbon groups such as alkyl groups, aryl groups or the like in this case as well as in other cases hereinafter follows); alcohols (ROH); ethers (R—O—R'); aldehydes (RCHO); fatty acids (RCOOH); ketones (RCOR'); nitriles (RCN); amines ($R_nNH_{3-n}$ wherein n=1, 2 or 3, including, in addition to the above-mentioned ones, alcohol-amines and cyclic amines); isocyanates (RNCO); azo-compounds (R—N=N—R'); phosphines {$R_nPR'_{3-n}$ (wherein n=1, 2 or 3)}; phosphites {$P(OR)_3$}; phosphinites {$RP(OR')_2$}; thioethers {$R_nSR'_{2-n}$ (wherein n=1 or 2)}; thioalcohols (RSH) and the like. Further polysiloxanes are also used as electron donors. Among these electron donors, esters, alcohols, ethers, ketones, phosphines, polysiloxanes are preferred and esters are used as most preferable compounds.

Concrete examples of electron donors include alcohols such as methanol, ethanol, propanol, butanol, pentanol, hexanol, octanol, phenol, cresol, xylenol, ethylphenol, naphthol and the like; ethers such as diethyl ether, di-n-propyl ether, di-n-butyl ether, di(isoamyl) ether, di-n-pentyl ether, di-n-hexyl ether, di-n-octyl ether, di-i-octyl ether, ethylene glycol monomethyl ether, diphenyl ether, tetrahydrofuran, anisole, diphenyl ether and the like; esters such as ethyl acetate, butyl formate, amyl acetate, vinyl butyrate, vinyl acetate, methyl benzoate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate and the like; aldehydes such as acetaldehyde, benzaldehyde and the like; fatty acids such as formic acid, acetic acid, propionic acid, butyric acid, oxalic acid, tartaric acid, acrylic acid, maleic acid, benzoic acid and the like; ketones such as methylethyl ketone, methyl isobutyl ketone, benzophenone and the like; nitriles such as acetonitrile, amines such as methylamine, diethylamine, tributylamine, triethanolamine, pyridine, aniline, dimethylaniline and the like; isocyanates such as phenylisocyanate, toluylisocyanate and the like; azo-compounds such as azobenzene and the like; phosphines such as ethylphosphine, triethylphosphine, tri-n-butylphosphine, tri-n-octylphosphine, triphenylphosphine and the like; phosphites such as dimethylphosphite, di-n-octylphosphite, tri-n-butylphosphite, triphenylphosphite; phosphinites such as ethyldiethylphosphinite, ethyldibutylphosphinite, phenyldiphenylphosphinite and the like; thioethers such as diethyl thioether, diphenyl thioether, methyl phenyl thioether, ethylene sulfide, propylene sulfide and the like; and thioalcohols such as ethylthioalcohol, n-propylthioalcohol, thiophenol and the like.

As polysiloxanes, chain or cyclic siloxane polymers represented by the general formula of

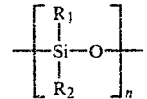

(wherein n is from 3 to 10,000; $R_1$ and $R_2$ represent the same or different substituents capable of connecting with silicon) are used, but above all those wherein $R_1$ and $R_2$ are each one hydrogen, a hydrocarbon radical such as an alkyl, an aryl or the like, halogen, an alkoxy group, an aryloxy group, a carboxylic group or more than one, and the foregoing members are connected and distributed in a molecule in various ratios, are used. Customarily used polysiloxanes are those in which each R of the above-mentioned formula is a hydrocarbon group. As concrete examples, alkylsiloxane polymers e.g. a lower polymer such as octamethyltrisiloxane, octaethylcyclotetrasiloxane and alkylsiloxanes such as dimethylpolysiloxane, ethylpolysiloxane, methylethylpolysiloxane, arylsiloxane polymers such as hexahexylcyclotrisiloxane, diphenylpolysiloxane; alkylarylsiloxane polymers such as diphenyloctamethyltetrasiloxane, methylphenylpolysiloxane are illustrated. Further, alkylhydrogensiloxane polymers wherein $R_1$ is hydrogen or halogen and $R_2$ is a hydrocarbon group such as an alkyl group, an aryl group or the like or haloalkylsiloxane polymers or haloarylsiloxane polymers can also be mentioned. Further polysiloxanes wherein R is an alkoxy or an aryloxy group or a residual group of fatty acid, are also useful. As for the viscosity of polysiloxanes, a value in the range of from 10 to 10,000 centistokes at 25° C. preferably from 10 to 2,000 centistokes is suitable.

These electron donors can be used in the form of a mixture.

The electron acceptor (D) used in the present invention includes halides of a metal of the IIIrd to VIIIth group of the periodical table. For example, $AlCl_3$ (anhydrous), $SiCl_4$, $SnCl_2$, $SnCl_4$, $TiCl_4$, $ZrCl_4$, $PCl_3$, $PCl_5$, $VCl_4$, $SbCl_5$, $SCl_2$, $MnCl_2$, $FeCl_2$, $NiCl_2$ and the like can be illustrated. These can also be used in the form of a mixture. Among the electron acceptors, $AlCl_3$ (anhydrous), $SiCl_4$, $SnCl_2$, $SnCl_4$ and $TiCl_4$ are preferably used.

When a solid product (I) is reacted with an electron donor and/or an electron acceptor, a solvent can be used. A solvent can be used also for washing after reaction. As such a solvent, aliphatic hydrocarbons such as n-pentane, n-hexane, n-heptane, n-octane, i-octane, n-nonane, n-decane and the like, aromatic hydrocarbons such as benzene, toluene, xylene, ethyl benzene, cumene and the like and halogenated hydrocarbons such as carbon tetrachloride, chloroform, dichloroethane, trichloroethylene, tetrachloroethylene, carbon tetrabromide, chlorobenzene, orthodichlorobenzene or the like (hereinafter these compounds will be referred simply to as a solvent).

As for a method for reacting a solid product (I) with one or more electron donors and also with one or more electron acceptors each in steps of from one to 10 and by using titanium tetrachloride as an electron donor at least in one step, various kinds of modes such as those hereinafter described can be adopted.

As for the state in which a reaction is carried out, the reaction can be carried out in suspension state in the presence or absence of a solvent (hereinafter referred to sometimes as a suspension reaction) or the reaction can be carried out simultaneously with milling by using a mill such as a vibrating mill, ball mill or the like (hereinafter referred to sometimes as a milling reaction). Suspension reaction and milling reaction can be combined. Hereinafter reaction includes any of the modes of suspension reaction, milling reaction and a combination of the two modes.

When more than one electron donors (C) are used, they can be used in the mixed state but when a reaction in which (C) is used in more than one step, two kinds of (C) can be used either in the mixed state or separately in each step.

In the present invention, titanium tetrachloride as an electron acceptor (D) is always used, and those (D) other than titanium tetrachloride are used when more than one (D) are used. When more than one (D) are used, they can be used in the form of a mixture. When the reactions in which (D) is used, are carried out in a plurality of steps, more than one (D) can be used in the form of a mixture or in separate form. The reaction in which (D) is used is carried out in one or a plurality of steps, and titanium tetrachloride is used as (D) in at least one step. In that case, it is preferable to use as (D), titanium tetrachloride alone, but it is possible to use a mixture with another electron acceptor having a mixing ratio of titanium tetrachloride of 20% by weight or more. In the description of the reaction in which (D) is used, when "titanium tetrachloride" is referred to as (D), it is intended to include the above-mentioned mixture besides titanium tetrachloride alone.

As for the order of addition or reaction of the three substances to be reacted, various kinds can be mentioned, but as some representative examples, the following methods can be mentioned:

(1) As for methods for reacting (C) and (D) with a solid product (I) in one step, there are following modes:

(1-1) A method in which three members of a solid product (I), (C) and (D) are added and reacted in an optional order.

(1-2) A method in which a solid product (I) is reacted with a reaction product between (C) and (D).

(1-3) A method in which (C) is reacted with a solid product (I) and then (D) is reacted.

(2) A method in which, when (C) and (D) are reacted with a solid product (I), either one or both of (C) and (D) are used in two steps or more, and at least in one step, $TiCl_4$ is used as (D). There are following modes in this method: For example, (2-1) A method in which (C) is reacted with a solid product (I) and then (D) is reacted in two steps or more;

(2-2) A method in which ($C_1$) is reacted with a solid product (I) and then ($C_2$) and (D) are reacted according to a method of (1);

(2-3) A method in which ($D_1$) is reacted with a solid product (I) and then (C) and ($D_2$) are reacted according to a method of (1);

(2-4) A method in which ($C_1$) and ($D_1$) are reacted with a solid product (I) according to a method of (1) and then ($D_2$) is reacted in one or more steps;

(2-5) A method in which ($C_1$) and ($C_2$) in the coexistent state are reacted with a solid product (I), or stepwise ($C_1$) and then ($C_2$) are reacted with the solid product (I), then ($D_1$) is reacted and then ($D_2$) is reacted in one or more steps;

(2-6) A method in which ($C_1$) is reacted with a solid product (I), ($C_2$) is reacted, and then ($C_3$) and (D) are reacted according to the method of (1); and (2-7) A method in which ($C_1$) and ($D_1$) are reacted with a solid product (1) according to a method of (1), and then ($C_2$) and ($D_2$) are reacted according to a method of (1).

In the above-mentioned descriptions of various modes, a phrase "then . . . is reacted" or a word "step" of reaction means one end of reaction operation and it is to be noted as a general practice that unreacted products or unnecessary reaction products are removed after termination of reaction each time when reactions are carried out in two or more steps. With regard to the removal operation of the above-mentioned materials, if the greater part of objective materials of removal is in the form of liquid by themselves or soluble in a solvent and a solvent is used in a reaction, such a process as decantation, filtration or evaporation to dryness can be used because the materials are in liquid state, or the above-mentioned process can be applied after addition of a solvent even when a solvent is not used in a reaction. In such a case, the removal of unreacted products or unnecessary reaction products does not require strictness. Accordingly, if an amount of (C) or (D) used in a reaction is small and unreacted products and unnecessary products are almost none or slight, shift to a next reaction can be made by omitting the removal operation. In the mode (1-2), the reaction product between (C) and (D) can be obtained by mixing (C) and (D) but in this case a solid product (I) can be added in the state where unreacted products, etc. are present.

Further in the above-mentioned description, ($C_1$), ($C_2$), etc. and ($D_1$), ($D_2$), etc. mean that different kinds of (C) or (D) are used. Same kind of (C) or (D) means not only a single compound but also a mixture of two or more single compounds. However, if two or more kinds of (D) are used such as (D$_1$), (D$_2$), etc., at least one of them is TiCl$_4$.

As for steps of reaction of (C) or (D), the repetition of the use of the same material or different materials should be up to 10 steps, preferably up to 5 steps. Even when reaction is carried out in more than 10 steps, effectiveness attained is less.

As for the amounts of use of (C) an elecron donor, (D) an electron acceptor and solvent at the time of their reaction with a solid product (I), it is preferable that (C) is in the range of 1~5,000 g, (D) is in the range of 1~5,000 g and solvent is in the range of 0~5,000 ml per 100 g of the solid product (I) in every time of reaction.

As for the reaction conditions, it is preferable that reaction temperature is in the range of 0°~500° C., preferably 20°~200° C., and preferable range of reaction time varies according to reaction state, e.g. one minute to 10 hours in the reaction carried out in suspension state, 5 to 200 hours for a ball mill and 10 minutes to 50 hours for a vibrating mill in case of reaction carried out by way of a milling machine. The reaction product between (C) and (D) in the mode (2-1), can be obtained by mixing the both at a temperature from room temperature (about 20° C.) to 150° C. for one minute or more.

Among the reaction modes above-mentioned, most preferable is (2-1), (2-4) or (2-5). In the modes of (2-4) and (2-5), a case where SiCl$_4$ is used as (D$_1$) and TiCl$_4$ is used as (D$_2$) is most preferable.

With regard to the reaction state at the time of practice of these modes, milling reaction is most preferable for reacting (D$_1$) SiCl$_4$ {singly, the mode (2-5) or together with (C), the mode (2-4)}, and suspension reaction is most preferable for reacting (D$_2$) TiCl$_4$. The number of reaction steps of (D$_2$) is most effective if it is one or two.

A product thus obtained will be referred to as a solid product (II).

The solid product (II) is taken out by subjecting a reaction liquid to distilling-off under subatmospheric or atmospheric pressure to remove unreacted (C) and (D) or to filtering-off or decantation, followed by washing with a solvent and drying, after completion of reaction. Alternatively, it is subjected to repeated washings with a solvent after decantation, and used in the next reaction in the suspension state containing a solvent added.

In preparing a catalyst by combining the solid product (II) with (E) an organoaluminum compound and (C) an electron donor, a part or the whole the catalyst components are subjected to polymerization treatment with an α-olefin in the coexistence of at least both of the solid product (II) and (E) the organoaluminum compound to form a preliminarily activated catalyst. The terms herein used as "polymerization treatment" means that a small amount of α-olefin is brought into contact with catalyst components under polymerizable conditions and said α-olefin is polymerized. By this polymerization treatment, the catalyst components are brought to a state coated with polymer. When the polymerization treated is carried out in the presence of the whole catalyst components, the catalyst preparation will be completed by this procedure, but if a part of a catalyst component among the catalyst components is used in the polymerization treatment, and the rest of said catalyst component is added after the polymerization treatment, the catalyst preparation will be completed by the procedure of the addition of the rest.

The organoaluminum compounds used in the present invention include trialkylaluminums such as trimethylaluminum, triethylaluminum, tri-n-propylaluminum, tributylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc., alkylaluminum dihalides such as ethylaluminum dichloride, i-butylaluminum dichloride; alkylaluminum hydride such as diethylaluminum hydride, alkylaluminum sesquihalides such as methylaluminum sesquichloride, ethylaluminum sesquichloride. In addition, alkoxyalkylaluminums such as monoethoxydiethylaluminum, diethoxymonoethylaluminum, etc. can also be used.

The electron donors (C) to be combined with a solid product (II) are the same with those described in the preparation of the solid product (II).

The α-olefins used in the polymerization treatment include ethylene, propylene, butene-1, hexene-1, heptene-1, octene-1, decene-1 and other straight chain monoolefins; 4-methyl-pentene-1, 2-methyl-pentene-1, 3-methyl-butene-1 and other branched chain monoolefins; styrene; and the like. These α-olefins can be the same with or different from α-olefin which will become the object of actual polymerization of α-olefin.

The activation of catalyst by means of the polymerization treatment in advance of actual polymerization is made usually in a hydrocarbon solvent such as n-hexane, n-heptane, n-octane, benzene, toluene or the like. It can also be carried out in a liquefied α-olefin such as liquefied propylene, liquefied butene-1, or the like. The coexistence of hydrogen at the time of the polymerization treatment is also allowable.

The amounts of solvent, (E) an organoaluminum compound, the solid product (II), (C) an electron donor, and (F) α-olefin used in the preliminary activation, will be sufficient if 0.1 l~200 l of solvent, 0.5 g~500 g of (E), 0.05~20 g of (C), and 0.05~1,000 g of (F) are used, respectively.

There are various methods of the preliminary activation by subjecting at least one part or the whole parts of the catalyst components (i.e. the solid product (II), (E) an organoaluminum compound and (C) an electron donor) to polymerization treatment with (F) an α-olefin in the coexistence of at least both of the solid product (II) and (E). For example, there are a method (1) in which after (E), the solid product (II) and (C) are mixed, preliminary activation (preactivation) is carried out by adding (F); a method (2) in which the solid product (II), (E) and (C) are added in an optional order in the presence of (F); a method (3) in which after the solid product (II) and (E) are mixed; (F) is added and then (C) is added; (4) a method in which after the solid product (II), (E) and (C$_1$) are added in an optional order, (F) is added and then (C$_2$) is added [(C$_1$) and (C$_2$) can be same or different]; (5) a method in which after (E) and the solid product (II) are added or after the solid product (II), (E) and (C$_1$) are added in an optional order, (F$_1$) is added, and after (C$_2$) is added, (F$_2$) is added further [(C$_1$) and (C$_2$), and (F$_1$) and (F$_2$) can be same or different, respectively]. When the solid product (II), (E) and (F) have been brought into coexistence, the polymerization treatment is carried out. At the time of mixing or addition of the respective components of the solid product (II), (C), (E) and (F), stirring is carried out if it is necessary. The temperature at the time of mixing or addition of the respective components will be preferably in the range from room temperature (about 20° C.) to 100° C. There will be no limitation as to the time necessary for the addition or mixing of the respective components. It can be carried out over a total period of several minutes to several hours. The preparation of an activated catalyst will be completed by the addition of last component. Among the above-mentioned methods, the methods of (3) to (5) give particularly good result.

The catalyst thus obtained is used for producing α-olefin polymers.

The α-olefins applied in the method of the present invention include ethylene, propylene, butene-1, hexene-1, heptene-1, octene-1, decene-1 and other straight chain monoolefins, 4-methyl-pentene-1, 2-methyl-pentene-1, 3-methyl-butene-1, and other branched chain monoolefins, butadiene, isoprene, chloroprene and other diolefins, styrene and the like. These can be subjected not only to homopolymerizations but also to copolymerization with other α-olefin e.g. propylene and ethylene, butene-1 and ethylene, propylene and butene-1, etc.

Polymerization reaction can be carried out in a hydrocarbon solvent such as n-hexane, n-heptane, n-octane, benzene, toluene and the like. Besides this, it can be carried out in an α-olefin e.g. liquefied propylene, liquefied butene-1 without using a solvent. In the practice, a polymerization temperature in the range of room temperature (about 20° C.) to 200° C., a polymerization pressure in the range of atmospheric (0 Kg/cm$^2$G) to 50 Kg/cm$^2$G, and as a usual time, 5 minutes to 10 hours are used. An appropriate amount of hydrogen can be added in order to control molecular weight at the time of polymerization.

The first effect of the present invention is the fact that the stabilized production of polymers can be carried out by the remarkable improvement of stability of catalyst. For example, if the solid product (II), (E) and (C) are mixed and left to stand as they are without subjecting to preactivation before a regular polymerization is carried out, drawbacks such as a drastic reduction in polymerization activity, tremendous lowering of crystallinity, deterioration of powder shape, etc. appear even after one day, and thus there has been raised a problem in the stability of production of α-olefin polymers. In the present invention, these drawbacks have been improved. Further, reductions in the polymerization activity and crystallinity of polymer with lapse of polymerization time have become less and hence the drawbacks of these points have also been overcome.

Further there have been also drawbacks in that polymerization reaction has been influenced by the variance of slightest difference in the manner of mixing of (E) or (C) and mixing condition of (E), (C) and the solid product (II). The present invention has also improved these drawbacks.

Due to the first effect of the present invention the effects of the above-mentioned invention (5) (i.e. higher crystallinity of polymer, higher yield of polymer, effective utilization of a transition metal, capability of controlling molecular weight distribution in a narrow range, better shape of polymer particles, etc.) can be maintained with holding their higher values as they are even when there is a lapse of time after preparation of a catalyst and even when polymerization time elapses. These effects will be explained further hereinafter.

The second effect of the present invention is capability of producing polymers of higher crystallinity in the production of α-olefin polymers. For example, in the production of propylene polymer, crystalline polypropylene as n-hexane-insoluble polymer amounts to 98%.

The third effect of the present invention is the very higher yield of α-olefin polymer per solid product (II), particularly in the polymerization of propylene, it reaches up to $0.5 \times 10^4 \sim 2 \times 10^4$ g (polymer)/g [solid product (II)] under usual polymerization conditions. No coloration and no degradation of physical properties of polymers occur and such an adverse influence as rusting of mold at the time of shaping of polymers is not observed even if a step of removal of remaining catalyst, i.e. ash-removal step is omitted.

The fourth effect is the extremely effective utilization of a transition metal, and in case of common polymerization of propylene, efficiency reaches up to $1 \times 10^4 \sim 1 \times 10^6$ g (polymer)/g (transition metal atom).

The fifth effect of the present invention is the capability of controlling molecular weight distribution in a narrower range i.e. in the range of 3.5~7.0 of $\overline{M}w/\overline{M}n$ even there is a lapse of time after preparation of a catalyst.

The sixth effect of the present invention is the capability of producing polymer particles having better shape, e.g. the capability of production of polymer having a bulk density (B.D.) in the range of 0.40~0.50.

The present invention will be further illustrated by way of Examples.

EXAMPLE 1

(1) Preparation of solid product (II)

One hundred thirty g of aluminum trichloride (anhydrous) and 58 g of magnesium hydroxide were reacted while being milled by means of a vibrating mill at 250° C. for 3 hours. Reaction occurred with evolution of hydrogen chloride gas. After completion of heating, the resulting material was cooled in a nitrogen current to obtain a solid product (I).

One hundred g of said solid product (I), 22 g of ethyl cinnamate and 35 g of silicon tetrachloride were introduced into a vibrating mill and reacted together while being milled at 40° C. for 5 hours. After completion of the reaction, the reaction product was suspended in 1,600 ml of titanium tetrachloride and reacted at 80° C. for about 2 hours, and then 1,000 ml of titanium tetrachloride still containing dissolved material was removed by decantation, and further 1,000 ml of titanium tetrachloride was added to react them at 100° C. for 2 hours, followed by removal of supernatant liquid by decantation, repeating decantations four times each with 1,000 ml of n-hexane, separation by filtration in a dry box purged with nitrogen, and drying in vacuo (−750 mm Hg) for one hour, to obtain a solid product (II). The Ti atom content in this solid product (II) was 42 mg (Ti atom)/g (solid product (II)).

(2) Production of propylene polymer

Into a 1.5 l capacity stainless steel reactor purged with nitrogen were introduced 1 l of n-hexane, 285 mg of triethylaluminum and 12 mg of said solid product (II), and propylene was fed under a partial pressure of 1 Kg/cm$^2$G, at room temperature (20° C.) for 10 minutes (the amount of propylene polymerized being 0.39 g).

Thereafter 38 mg of methyl p-toluylate was added to prepare a preliminarily activated catalyst, which was then allowed to stand for 24 hours with stirring. Thereafter 75 ml of hydrogen was added, and polymerization reaction was carried out under a propylene partial pressure of 10 Kg/cm²G at 70° C. for 4 hours. After completion of the polymerization reaction, 50 ml of methanol was introduced into the reactor to terminate the polymerization, and then the contents were poured into a Buchner funnel, followed by washing three times each with 500 ml of n-hexane, separating a polymer (isotactic polypropylene) as n-hexane-insoluble, from a n-hexane-soluble polymer (atactic polypropylene) and drying the separated product, respectively to obtain polymers.

The amount of the isotactic polypropylene was 192 g and that of the atactic polypropylene was 5.8 g. The polymer yield of isotactic polypropylene per g of solid product (II) was 16,000 g. Its isotactic index was 97.1.

Isotactic index is expressed by the following formula:

$$\frac{\text{amount of isotactic polymer (g)}}{\text{amount of isotactic polymer (g)} + \text{amount of atactic polymer (g)}} \times 100$$

This definition of isotactic index will be applied to the descriptions mentioned below.

The bulk density (B.D.) of the above isotactic polymer was 0.44, and the shape of particle was close to a spherical form and good.

(3) Measurement of molecular weight distribution

Propylene polymer was dissolved in o-dichlorobenzene as solvent, and subjected to measurement of molecular weight distribution, employing a gas permeation chromatographic apparatus (G.P.C. 200 Type made by Waters Co., Ltd.) in a concentration of 0.1–0.5%, at 140° C. and at a flow rate of 1 ml/min (this measurement method will be applied to the subsequent Examples). The propylene polymer obtained in Example 1 had a $\overline{Mw}/\overline{Mn}$ of 4.7.

COMPARATIVE EXAMPLE 1

Catalyst preparation of Example 1 was repeated except that after triethylaluminum and solid product (II) were introduced, methyl p-toluylate was added without feeding propylene. Subsequent procedure of leaving a catalyst to stand for 24 hours with stirring (this procedure will be abbreviated hereinafter to standing of catalyst) and polymerization reaction of propylene were also carried out as in Example 1.

EXAMPLE 2

One hundred twenty g of aluminum trichloride (anhydrous) and 40 g of magnesium oxide were reacted while being milled by means of a vibrating mill at 120° C. for 48 hours to obtain a solid product (I). Into a ball mill (10 mm in diameter and capacity of 785 ml) containing 80 balls (10 mm in diameter) were introduced 20 g of said solid product (I) and 6 g of ethyl benzoate, and after milling for 24 hours, 12 g of silicon tetrachloride was introduced, and further, reaction was carried out while milling was continued for 48 hours. After completion of the milling reaction, the resulting material was suspended in 300 ml of titanium tetrachloride, and reaction was carried out at 80° C. for 2 hours. Thereafter 200 ml of titanium tetrachloride was removed by decantation, and further, 200 ml of titanium tetrachloride was added to react it at 60° C. for one hour, followed by removing 200 ml of titanium tetrachloride by decantation, repeating decantation four times each with 200 ml of n-hexane, and distilling off n-hexane in vacuo (−750 mmHg) at 35° C. for one hour to obtain a solid product (II). Employing this solid product (II), preparation of preliminarily activated catalyst, standing of catalyst and propylene polymerization were carried out as in Example 1.

COMPARATIVE EXAMPLE 2

Catalyst preparation, standing of catalyst and propylene polymerization were carried out as in Example 2 except that no propylene was fed in the catalyst preparation.

EXAMPLE 3

Two hundred eighteen mg of triethylaluminum, 18 mg of solid product (II) obtained in Example 2 and 25 mg of ethyl anisate were admixed together, and then 0.5 g of propylene was fed at 40° C. to prepare a preliminarily activated catalyst, which was then allowed to stand at room temperature (20° C.) for 24 hours with stirring, and thereafter propylene polymerization was carried out as in Example 1.

COMPARATIVE EXAMPLE 3

Catalyst preparation, standing of catalyst and propylene polymerization were carried out as in Example 3 except that no propylene was fed in the catalyst preparation.

EXAMPLE 4

One hundred ninty eight mg of triethylaluminum, 15 mg of solid product (II) obtained in Example 2 and 15 mg of methyl p-toluylate were added, and then 0.8 g of propylene was fed, followed by stirring at room temperature (20° C.) for 10 minutes. Thereafter 22 mg of ethyl p-toluylate was added to prepare a preliminarily activated catalyst, which was then allowed to stand with stirring for 6 hours, and then propylene polymerization was carried out as in Example 1.

COMPARATIVE EXAMPLE 4

Catalyst preparation, standing of catalyst and propylene polymerization were carried out as in Example 4 except that no propylene was fed in the catalyst preparation. (The stirring after propylene feed, carried out in Example 4, was also carried out in this Comparative example 4 and in the following Comparative examples as well).

EXAMPLE 5

Eighteen mg of solid product (II) obtained in Example 2 was added to 130 mg of triethylaluminum, and thereafter 1.5 g of propylene was added. After reaction at 40° C. for 10 minutes, 26 mg of ethyl benzoate was added and thereafter 0.5 g of propylene was added to prepare a preliminarily activated catalyst. This catalyst was then allowed to stand at room temperature (20° C.) for 48 hours with stirring, and thereafter propylene was polymerized as in Example 1.

COMPARATIVE EXAMPLE 5

Catalyst preparation, standing of catalyst and propylene polymerization were carried out as in Example 5 except that two steps propylene feeds were not carried out in the catalyst preparation.

EXAMPLE 6

Twenty mg of solid product (II) obtained in Example 1 was added to 280 mg of triisobutylaluminum, and 180 ml of hydrogen and 0.8 g of ethylene were added. After reaction at room temperature (20° C.) for 10 minutes, 35 mg of i-propyl benzoate was added to prepare a preliminarily activated catalyst, which was then allowed to stand at room temperature (20° C.) for 48 hours with stirring, and thereafter polymerization of propylene was carried out as in Example 1.

COMPARATIVE EXAMPLE 6

Catalyst preparation, standing of catalyst and propylene polymerization were carried out as in Example 6 except that hydrogen and ethylene were not added in the catalyst preparation.

EXAMPLE 7

One hundred ninty five mg of triethylaluminum and 12 mg of solid product (II) obtained in Example 2 were added, and propylene was fed under a propylene partial pressure of 4 Kg/cm$^2$G at 70° C. for 3 minutes (which corresponded to 0.52 g of polymerized propylene), and thereafter 28 mg of ethyl p-toluylate was added to prepare a preliminarily activated catalyst, which was then allowed to stand at 30° C. for one hour with stirring, and thereafter propylene was polymerized as in Example 1.

EXAMPLE 8

Sixty g of aluminum trichloride (anhydrous) and 20 g of hydrotalcite ($Mg_6Al_2(OH)_{16}CO_3.4H_2O$) were reacted on heating at 80° C. for 80 hours in a ball mill to obtain a solid product (I).

To 20 g of this solid product (I) was added 3 g of titanium tetrachloride, and reaction was carried out at 130° C. for 30 minutes in a ball mill. Thereafter, unreacted titanium tetrachloride was removed in vacuo, and 2.5 g of a complex of tetrahydrofuran and titanium tetrachloride (2:1) was added, and further, reaction was carried out at 50° C. for 48 hours to obtain a solid product (II).

Employing this solid product (II), preparation of a preliminarily activated catalyst, standing of catalyst and propylene polymerization were carried out as in Example 1.

COMPARATIVE EXAMPLE 7

Employing the solid product (II) obtained in Example 8, catalyst preparation, standing of catalyst and propylene polymerization were carried out as in Comparative example 1.

EXAMPLE 9

One hundred thirty three g of aluminum trichloride (anhydrous) and 98 g of magnesium carbonate were reacted while being milled in a ball mill on heating at 180° C. for 48 hours to obtain a solid product (I). To 20 g of this solid product (I) was added 5 g of a complex of ethyl phenylacetate and titanium tetrachloride (1:1), and reaction was carried out while being milled in a ball mill at 30° C. for 72 hours to obtain a reaction product (II).

Employing this solid product (II), preparation of a preliminarily activated catalyst, standing of catalyst and propylene polymerization were carried out as in Example 4.

COMPARATIVE EXAMPLE 8

Employing the solid catalyst (II) obtained in Example 9, catalyst preparation, standing of catalyst and propylene polymerization were carried out as in Example 1.

EXAMPLE 10

Twenty g of solid product (I) obtained in Example 9 was suspended in 100 ml of toluene, and then 12 g of methyl p-toluylate was added. Reaction was carried out at 100° C. for 30 minutes, followed by separation through filtration and drying to obtain 20 g of a solid, which was then suspended in 500 g of titanium tetrachloride, and reaction was carried out at 120° C. for one hour. After completion of the reaction, the resulting material was separated by filtration, followed by washing three times each with 150 ml of n-hexane and drying to obtain a solid product (II).

Employing this solid product (II), preparation of a preliminarily activated catalyst, standing of catalyst and propylene polymerization were carried out as in Example 1.

EXAMPLE 11

One hundred twenty g of ferric chloride (anhydrous) and 40 g of magnesium oxide were reacted while being milled in a vibrating mill on heating at 120° C. for 48 hours to obtain a solid product (I). To 20 g of this solid product (I) were added 10 g of anisole and 100 ml of titanium tetrachloride, and reaction was carried out at 160° C. for 2 hours, followed by separation through filtration, three times washings each with 150 ml of n-hexane and drying to obtain a solid product (II).

Employing this solid product (II), preparation of a preliminarily activated catalyst, standing of catalyst and propylene polymerization were carried out as in Example 1.

EXAMPLE 12

Twenty g of solid product (I) obtained in Example 2, 3 g of dimethylpolysiloxane (Toshiba Silicone oil TSF-451 (trademark) made by Toshiba Co., Japan; viscosity, 100 centistokes) and 6.0 g of ethyl benzoate were reacted while being milled in a ball mill at room temperature (20° C.) for 48 hours, and then the reaction product was suspended in 400 ml of titanium tetrachloride. After reaction at 130° C. for one hour, 300 ml of titanium tetrachloride was removed by decantation, and 300 ml of toluene was added, followed by stirring at 100° C. for 2 hours, thereafter removal by filtration, thereafter three times washings each with 250 ml of n-hexane, and drying to obtain a solid product (II).

Employing this solid product (II), preparation of a preliminarily activated catalyst, standing of catalyst and propylene polymerization were carried out as in Example 1.

COMPARATIVE EXAMPLE 9

Employing the solid catalyst (II) obtained in Example 12, catalyst preparation, standing of catalyst and propylene polymerization were carried out as in Comparative example 1.

EXAMPLE 13

Sixty g of ferric chloride (anhydrous) and 70 g of aluminum magnesium oxide ($MgAl_2O_4$) were reacted at 320° C. for 5 hours in a vibrating mill to obtain a solid product (I).

Twenty g of this solid product (I) was suspended in 180 ml of toluene, and 10 g of ethanol was added. Reaction was carried out at 30° C. for one hour, and thereafter 150 ml of toluene was added. Decantation was twice repeated and the total amount was made 180 ml, and then 8 g of benzophenone was added. Reaction was carried out at 60° C. for 30 minutes, followed by decantation, addition of 150 ml of toluene, and decantation. The total amount was made 60 ml, and then 170 g of titanium tetrachloride and 20 ml of di-n-butyl ether were added and reaction was carried out at 130° C. for one hour to obtain a solid product (II).

Employing this solid product (II), preparation of a preliminarily activated catalyst, standing of catalyst and propylene polymerization were carried out as in Example 5.

EXAMPLE 14

Forty g of a material obtained by heating 60 g of aluminum trichloride (anhydrous) and 65 g of hydromagnesite ($3MgCO_3.Mg(OH)_2.3H_2O$) at 100° C. for 2 hours, was reacted while being milled in a vibrating mill at 250° C. for one hour to obtain a solid product (I).

Twenty ml of a methylhydrogenpolysiloxane (Toshiba Silicone Oil TSF-484 (Trademark) made by Toshiba; viscosity, 16 centistokes) and 50 g of said solid product (I) were introduced into 200 ml of n-hexane, and reaction was carried out at 40° C. for one hour, followed by separation through filtration, washing with n-hexane and drying. To 20 g of the resulting dried solid were added 2 g of methyl toluylate and 6 g of titanium tetrachloride, and milling reaction was carried out in a ball mill at 80° C. for 20 hours, followed by maintaining the resulting material at 80° C. for 2 hours under reduced pressure and removing unreacted material to obtain a solid product (II).

Employing this solid product (II), preparation of a preliminarily activated catalyst, standing of catalyst and propylene polymerization were carried out as in Example 6.

EXAMPLE 15

Preparation of a preliminarily activated catalyst, standing of catalyst and propylene polymerization were carried out as in Example 1 except that the solid product (II) obtained in Example 12 was employed and 18 mg of diethylene glycol dimethyl ether was substituted for methyl p-toluylate.

The results of Examples 1~15 and Comparative examples 1~9 are shown in Table 1.

EXAMPLE 16

Twelve mg of solid product (II) obtained in Example 2 was added to 430 mg of triisobutylaluminum, and further 0.8 g of propylene was added. The resulting material was allowed to stand at room temperature (20° C.) for 10 minutes, and 18 mg of anisole was added to prepare a preliminarily activated catalyst, which was then allowed to stand at room temperature for 6 hours with stirring, and thereafter ethylene polymerization was carried out under a hydrogen partial pressure of 6 Kg/cm$^2$G and an ethylene partial pressure of 7 Kg/cm$^2$G, at 85° C. for 5 hours.

COMPARATIVE EXAMPLE 10

Catalyst preparation, standing of catalyst and ethylene polymerization were carried out as in Example 16 except that no propylene was added in the catalyst preparation.

EXAMPLE 17

Three hundred eighty mg of triethylaluminum, 10 mg of dimethylpolysiloxane and 8 mg of the solid product (II) obtained in Example 13 were mixed, and 2.4 g of butene-1 was added to prepare a preliminarily activated catalyst, which was then allowed to stand at room temperature for 30 minutes with stirring. Thereafter ethylene polymerization was carried out as in Example 16.

EXAMPLE 18

Three hundred eighty mg of tri-n-butylaluminum was mixed with 20 mg of solid product (II) obtained in Example 12, and 2.0 g of butene-1 was added. Stirring was carried out at room temperature (25° C.) for 10 minutes, and then 20 mg of diphenyl ether was added to prepare a preliminarily activated catalyst, which was then allowed to stand for 24 hours with stirring, and thereafter 480 g of butene-1 was continuously fed at 70° C. over 4 hours, and further, polymerization reaction was carried out for 2 hours. After completion of the reaction, solvent was evaporated to dryness from the resulting material to obtain 291 g of polybutene.

EXAMPLE 19

One hundred ninety five mg of triethylaluminum was mixed with 12 mg of solid product (II) obtained in Example 2, and then 80 ml of hydrogen and 0.8 g of propylene were added. After stirring at room temperature (25° C.) for 10 minutes, 25 mg of methyl p-toluylate was added, and further, 0.3 g of propylene was added to prepare a preliminarily activated catalyst, which was then allowed to stand at room temperature (25° C.) for 30 minutes with stirring, and thereafter, polymerization reaction was carried out under a propylene partial pressure of 10 Kg/cm$^2$G, at a polymerization temperature of 60° C. for 4 hours, while feeding ethylene 8 times, each in an amount of 10 g, at intervals of 30 minutes. After completion of the reaction, subsequent procedure was carried out as in Example 1 to obtain a propylene-ethylene copolymer.

COMPARATIVE EXAMPLE 11

Catalyst preparation, standing of catalyst and propylene-ethylene copolymerization were carried out as in Example 19 except that hydrogen and propylene were not added and additional propylene was not added in the catalyst preparation.

EXAMPLE 20

Propylene-butene-1 copolymerization was carried out as in Example 19 except that butene-1 was substituted for ethylene as a comonomer.

EXAMPLE 21

To 20 g of solid product (I) obtained in Example 2 were added 2 g of cumyl alcohol and 5 g of ethyl benzoate, and reaction was carried out while being milled in a ball mill for 24 hours at 30° C. Thereafter 9 g of silicon tetrachloride was added, and further, milling reaction was carried out for 48 hours. Twenty g of the resulting solid was suspended in 200 g of titanium tetrachloride, and reaction was carried out for 4 hours, followed by removing supernatant liquid by decantation, three times washings each with 150 ml of trichloroethylene and drying to obtain a solid product (II).

Employing this solid product (II), preparation of a preliminarily activated catalyst, still standing of catalyst and propylene-butene-1 copolymerization were carried out as in Example 20.

The results of Examples 16~21 and Comparative examples 10~11 are shown in Table 2.

Employing this solid product (II), propylene polymerization in liquefied propylene was carried out as follows:

Thirteen mg of the solid product (II) and 220 mg of triethylaluminum were added into 20 ml of n-hexane, and propylene was fed under a propylene partial pres-

TABLE 1

| Nos. of Example and Comparative examples | Ti atom content in solid product (II) (mg/g) | Polymer yield (g) per g of solid product (II) | Polymer yield (g) per g of Ti atom | Isotactic index | BD | $\overline{M}w/\overline{M}n$ | MFR |
|---|---|---|---|---|---|---|---|
| Ex. 1 | 42.0 | 16,000 | $3.8 \times 10^5$ | 97.1 | 0.44 | 4.7 | 6.8 |
| Comp. ex. 1 | 42.0 | 4,900 | $1.2 \times 10^5$ | 82.5 | 0.28 | 8.0 | 7.5 |
| Ex. 2 | 30.5 | 18,000 | $5.9 \times 10^5$ | 96.4 | 0.45 | 4.5 | 5.4 |
| Comp. ex. 2 | 30.5 | 5,200 | $1.7 \times 10^5$ | 92.3 | 0.31 | 7.9 | 6.5 |
| Ex. 3 | 30.5 | 10,300 | $3.4 \times 10^5$ | 96.5 | 0.43 | 4.8 | 6.8 |
| Comp. ex. 3 | 30.5 | 3,500 | $1.1 \times 10^5$ | 90.8 | 0.29 | 6.5 | 7.8 |
| Ex. 4 | 30.5 | 19,400 | $6.4 \times 10^5$ | 98.0 | 0.47 | 5.1 | 6.2 |
| Comp. ex. 4 | 30.5 | 3,400 | $1.1 \times 10^5$ | 93.0 | 0.30 | 7.0 | 5.4 |
| Ex. 5 | 30.5 | 22,000 | $7.2 \times 10^5$ | 98.0 | 0.49 | 5.3 | 7.0 |
| Comp. ex. 5 | 30.5 | 4,100 | $1.3 \times 10^5$ | 92.0 | 0.29 | 7.2 | 8.0 |
| Ex. 6 | 42.0 | 18,000 | $4.3 \times 10^5$ | 97.5 | 0.45 | 4.8 | 6.5 |
| Comp. ex. 6 | 42.0 | 4,300 | $1.0 \times 10^5$ | 90.9 | 0.26 | 8.1 | 3.7 |
| Ex. 7 | 30.5 | 19,200 | $6.3 \times 10^5$ | 98.0 | 0.45 | 4.2 | 5.8 |
| Ex. 8 | 35.0 | 12,300 | $3.5 \times 10^5$ | 91.9 | 0.43 | 4.1 | 5.7 |
| Comp. ex. 7 | 35.0 | 2,400 | $0.7 \times 10^5$ | 85.4 | 0.21 | 7.5 | 5.6 |
| Ex. 9 | 27.0 | 10,200 | $3.8 \times 10^5$ | 93.5 | 0.40 | 4.5 | 5.4 |
| Comp. ex. 8 | 27.0 | 2,800 | $1.0 \times 10^5$ | 91.0 | 0.26 | 7.6 | 4.8 |
| Ex. 10 | 30.2 | 10,100 | $3.3 \times 10^5$ | 94.6 | 0.40 | 5.3 | 6.0 |
| Ex. 11 | 35.0 | 8,400 | $2.4 \times 10^5$ | 92.1 | 0.42 | 4.8 | 4.9 |
| Ex. 12 | 30.1 | 14,900 | $5.0 \times 10^5$ | 95.6 | 0.43 | 4.6 | 6.4 |
| Comp. ex. 9 | 30.1 | 4,200 | $1.4 \times 10^5$ | 92.1 | 0.30 | 7.9 | 5.6 |
| Ex. 13 | 22.3 | 7.500 | $3.4 \times 10^5$ | 90.8 | 0.40 | 5.1 | 4.8 |
| Ex. 14 | 29.4 | 12,800 | $4.4 \times 10^5$ | 94.9 | 0.41 | 5.2 | 7.8 |
| Ex. 15 | 30.1 | 12,100 | $4.0 \times 10^5$ | 93.5 | 0.42 | 4.3 | 7.1 |

TABLE 2

| Nos. of Example and Comparative examples | Ti atom content in solid product (II) (mg/g) | Polymer yield (g) per g of solid product (II) | Polymer yield (g) per g of Ti atom | isotactic index | $\overline{M}w/\overline{M}n$ | MFR |
|---|---|---|---|---|---|---|
| Ex. 16 | 30.5 | 16,300 | $5.3 \times 10^5$ | — | 4.5 | 5.8 |
| Comp. ex. 10 | 30.5 | 7,400 | $2.4 \times 10^5$ | — | 6.9 | 4.2 |
| Ex. 17 | 30.1 | 17,200 | $5.7 \times 10^5$ | — | 4.0 | 6.2 |
| Ex. 18 | 30.1 | 14,600 | $4.9 \times 10^5$ | — | 6.9 | 5.2 |
| Ex. 19 | 30.5 | 17,400 | $5.7 \times 10^5$ | 94.0 | 5.0 | 8.2 |
| Comp. ex. 11 | 30.5 | 4,900 | $1.6 \times 10^5$ | 89.3 | 7.2 | 6.3 |
| Ex. 20 | 30.5 | 15,600 | $5.1 \times 10^5$ | 95.0 | 5.2 | 4.8 |
| Ex. 21 | 42.1 | 18,300 | $4.3 \times 10^5$ | 95.6 | 4.8 | 6.2 |

EXAMPLE 22

One hundred thirty three g of aluminum trichloride (anhydrous) and 40 g of magnesium oxide were milled for 24 hours, heated at 120° C. for 2 hours, and after cooling, further milled for 10 hours to obtain a solid product (I).

A material obtained in advance by mixing and reacting 12 g of ethyl benzoate with 4.5 g of silicon tetrachloride, at room temperature (20° C.), and 40 g of said solid product (I) were reacted while being milled in a ball mill at 35° C. for 48 hours to give powdery material. Twenty g of this powdery material was suspended in 180 g of titanium tetrachloride, and reaction was carried out at 80° C. for 2 hours, followed by removing supernatant liquid by decantation, further adding 180 g of titanium tetrachloride, reaction at 80° C. for one hour, removing supernatant liquid by decantation, twice repeating a procedure of adding 150 ml of n-hexane and removing by decantation, separation through filtration in a dry box and drying to obtain a solid product (II). The Ti atom content in 1 g of this solid product (II) was 19 mg.

sure of 1 Kg/cm$^2$G at 20° C. for 30 minutes (the amount of propylene corresponding to 0.6 g). Sixty mg of methyl p-toluylate was then added, and the resulting material was allowed to stand at 20° C. for 24 hours with stirring to prepare a preliminarily activated catalyst. The total amount of this preliminarily activated catalyst was suspended in 500 g of liquefied propylene, and 75 ml of hydrogen was introduced. Polymerization reaction was carried out at a polymerization temperature of 70° C., under a pressure of 30.5 Kg/cm$^2$G, for 3 hours. After completion of the polymerization reaction, remaining propylene was removed to give 172 g of a propylene polymer. The polymer yield per g of the solid product (II) was 13,230 g. Polymer yield per g of Ti atom: $7.0 \times 10^5$ g. n-Hexane-insoluble (obtained by extraction with boiling n-hexane for 8 hours by means of a Soxhlet extractor, employing 5 g of polymer and 50 ml of n-hexane): 97.0%. BD of polymer: 0.43. MFR: 4.8. $\overline{M}w/\overline{M}n$: 4.5.

COMPARATIVE EXAMPLE 12

Solid product (II) and triethylaluminum were mixed together, and allowed to stand at 20° C. for 30 minutes, and methyl p-toluylate was added, as in Example 23, but no propylene was fed. Subsequent propylene polymerization was carried out as in Example 23.

Polymer yield: 3,300 g/g of solid product (II), and $1.7 \times 10^5$ g/g of Ti atom. n-Hexane-insoluble: 90.5%. Polymer BD: 0.30. $\overline{M}w/\overline{M}n$: 7.5. MFR: 5.7. These values were inferior to those in Example 23.

EXAMPLES 23~24 AND COMPARATIVE EXAMPLES 13~14

Employing the solid product (II) obtained in Example 22, the difference of the reductions in catalyst activity with the lapse of time during polymerization, between the case of addition of an α-olefin and the case of no addition thereof in preparation of catalyst was observed.

Two hundred sixty mg of triethylaluminum and 11 mg of solid product (II) were added, and propylene was fed under a propylene partial pressure of 1 Kg/cm²G at room temperature (20° C.) for 10 minutes, and then 38 mg of methyl toluylate was added to prepare a preliminarily activated catalyst. Seventy five ml of hydrogen was added, and polymerization reaction was carried out as in Example 1, under a propylene partial pressure of 10 Kg/cm²G, at 70° C. for one hour in case of Example 23 and at 70° C. for 4 hours in case of Example 24.

For comparison's sake, 260 mg of triethylaluminum and 11 mg of solid product (II) were added and allowed to stand at room temperature (20° C.) for 10 minutes, without feeding propylene. Thereafter 38 mg of methyl toluylate was added and further 75 ml of hydrogen was added. Polymerization reaction was carried out as in Example 1, under a propylene partial pressure of 10 Kg/cm²G, at 70° C. for one hour in case of Comparative example 13 and at 70° C. for 4 hours in case of Comparative example 14. The results are shown in Table 3. As apparent from the results, when propylene was added to carry out a preliminary activation of catalyst, the polymerization activity reduction and the crystallinity reduction with the lapse of time were suppressed and a notable improvement was achieved.

TABLE 3

| Example or Comparative example | Polymerization time (hrs) | Ti atom content in solid product (II) (mg/g) | Polymer yield (g) per g of solid product (II) | Polymer yield (g) per g of Ti atom | Isotactic index | Mw/Mn | MFR |
|---|---|---|---|---|---|---|---|
| Example 23 | 1 | 19.0 | 7,000 | $3.7 \times 10^5$ | 98.0 | 4.5 | 4.8 |
| Comparative example 13 | 1 | 19.0 | 3,000 | $1.6 \times 10^5$ | 93.0 | 5.0 | 4.1 |
| Example 24 | 4 | 19.0 | 17,000 (2,000)* | $8.9 \times 10^5$ | 97.1 | 4.8 | 4.2 |
| Comparative example 14 | 4 | 19.0 | 5,800 (50)* | $3.1 \times 10^5$ | 82.5 | 7.5 | 3.8 |

*Numeral figures in the parenthese show the yield of polymer formed during one hour between 3 hours and 4 hours after initiaion of polymerization.

EXAMPLE 25 AND COMPARATIVE EXAMPLE 15

Employing the solid catalyst (II) obtained in Example 22, reproducibilities in case of addition of an α-olefin and no addition thereof in preparation of a catalyst were observed. The same procedure was repeated 10 times, and the average values obtained and $\sigma_n$s were compared.

PROCEDURE OF EXAMPLE

Two hundred ninety five mg of triethylaluminum, 36 mg of methyl p-toluylate and 13 mg of solid product (II) were added within one minute, and propylene was fed at 40° C. for 5 minutes. Thereafter propylene polymerization reaction was carried out as in Example 1.

PROCEDURE OF COMPARATIVE EXAMPLE

Triethylaluminum, methyl p-toluylate and the solid product (II) were added within one minute, and allowed to stand at 40° C. for 5 minutes without feeding propylene. Propylene polymerization reaction was carried out as in Example 1.

The results are shown in Table 4. As apparent from the results, the dispersion in case of the present invention was less, and yet a higher polymerization activity of catalyst and a polymer having a higher crystallinity were obtained.

TABLE 4

| | Example 25 | | Comparative example 15 | |
|---|---|---|---|---|
| Number of times of tests (n) | Polymer yield (g) (per g of solid product (II)) ($x_i$) | Isotactic index | Polymer yield (g) (per g of solid product (II)) | Isotactic index |
| 1 | 12,300 | 96.0 | 8,600 | 91.8 |
| 2 | 11.800 | 96.5 | 9,200 | 95.0 |
| 3 | 11,000 | 96.6 | 6,500 | 93.8 |
| 4 | 10,800 | 96.3 | 4,800 | 90.0 |
| 5 | 11,500 | 96.0 | 9,500 | 90.5 |
| 6 | 12,000 | 95.9 | 8,600 | 92.8 |
| 7 | 12,100 | 96.1 | 7,300 | 94.0 |
| 8 | 11,900 | 96.8 | 5,200 | 95.0 |
| 9 | 11,600 | 96.0 | 4,300 | 90.0 |
| 10 | 11,300 | 96.2 | 8,000 | 90.8 |
| Average value ($\bar{x}$) | 11,630 | 96.2 | 7,200 | 92.4 |
| $\sigma_n$ | 460.5 | 0.29 | 1,803 | 1.9 |
| Maximum value-Minimum value | 1,500 | 0.9 | 5,200 | 4.5 |

($\sigma_n$ represents standard deviation and is expressed by $$\sigma_n = \sqrt{\frac{\Sigma(x_i - \bar{x})^2}{n}}.$$

The larger the value, the larger the dispersion. Further, the larger the difference between the maximum value and the minimum value, the larger the dispersion.)

What is claimed is:

1. In the method for producing α-olefin polymers by polymerizing α-olefins in the presence of a catalyst, said catalyst being obtained by:
   (a) reacting one mol of anhydrous AlCl₃ or anhydrous FeCl₃ with 0.1 to 20 mols of a compound selected from the group consisting of Mg(OH)₂, MgO, Mg₆Al₂(OH)₁₆CO₃.4H₂O, MgCO₃, MgAl- $_2O_4$ or $3MgCO_3 \cdot Mg(OH)_2 \cdot H_2O$; the reaction being carried out by milling and heating at a temperature between room temperature and 500° C., to thereby produce a solid product (I);

(b) reacting 1–5,000 g of at least one electron donor with 100 g of said solid product (I) in from one to ten steps in a suspension reaction manner or a milling reaction manner and at a temperature of between 0° C. and 500° C., (c) reacting 1–5,000 g of at least one electron acceptor with 100 g of said solid product (I) in from one to ten steps, using $TiCl_4$ as an electron acceptor in at least one step, in a suspension reaction manner or a milling reaction manner, and at a temperature of between 0° C. and 500° C., these two kinds of reactions (b) and (c) being carried out separately or simultaneously together to thereby form a solid product (II), (d) forming catalyst components by combining said solid product (II) with an organoaluminum compound and an electron donor, said electron donors being selected from the group consisting of compounds having the general formula RCOOR', ROH, ROR', RCOR', and polysiloxanes characterized by the formula

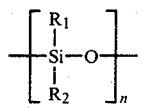

(wherein n=3 to 10,000 and $R_1$ and $R_2$ represent hydrogen or methyl and may be the same or different) and wherein in all of the foregoing formulas R and R' are alkyl or aryl groups having 1 to 20 carbon atoms, said electron acceptors being selected from the groups consisting of anhydrous $SiCl_4$, $SnCl_2$, $SnCl_4$ and $TiCl_4$, the improvement which comprises (1) carrying out a catalyst activation step by either
(A) contacting an α-olefin with said solid product (II) and an organoaluminum compound at a temperature of 20°–100° C. under polymerizing conditions so as to thereby effect a preliminary polymerization, and then adding to this preliminary polymerization product one of the electron donors set forth above so that the total amounts of said organoaluminum compound, said electron donor and said α-olefin are 0.05 to 500 g, 0.05 to 20 g and 0.05 to 1,000 g respectively based on one gram of said solid product (II), or (B) contacting an α-olefin with said solid product (II), an organoaluminum compound and one of said electron donors at a temperature of 20°–100° C. under polymerizing conditions so as to thereby effect a preliminary polymerization and then adding to this preliminary polymerization product one of the electron donors set forth above so that the total amounts of said organoaluminum compound, said electron donor and said α-olefin are 0.05 to 500 g, 0.05 to 20 g and 0.05 to 1,000 g respectively based on one gram of said solid product (II), and (2) polymerizing α-olefins in the presence of the catalysts activated in accordance with step (1).

2. The improvement according to claim 1 wherein in step (1) said solid product (II) is mixed with an organoaluminum compound; an α-olefin is added to carry out said preliminary polymerization treatment; and thereafter an electron donor is added.

3. The improvement according to step (1) of claim 1 wherein said solid product (II), an organoaluminum compound and an electron donor ($C_1$) are added in any order; thereafter an α-olefin is added to carry out said preliminary polymerization treatment; and thereafter an electron donor ($C_2$) is added, said ($C_1$) and ($C_2$) being the same or different.

4. The improvement according to step (1) of claim 1 wherein an organoaluminum compound is mixed with said solid product (II); thereafter an α-olefin ($F_1$) is added to carry out said preliminary polymerization treatment; thereafter an electron donor is added; and thereafter an α-olefin ($F_2$) is added to further carry out said preliminary polymerization treatment, said ($F_1$) and ($F_2$) being the same or different.

5. The improvement according to step (1) of claim 1 wherein an organoaluminum compound, said solid product (II) and an electron donor ($C_1$) are added in any order; thereafter an α-olefin ($F_1$) is added to carry out said preliminary polymerization treatment; thereafter an electron donor ($C_2$) is added; and thereafter an α-olefin ($F_2$) is added to further carry out said preliminary polymerization treatment, said ($C_1$) and ($C_2$), and said ($F_1$) and ($F_2$) being the same or different, respectively.

6. The improvement according to claim 1 wherein said solid product (I), at least one electron donor and at least one electron acceptor are admixed in any order and then reacted to form said solid product (II).

7. The improvement according to claim 1 wherein the reaction product of at least one electron donor with at least one electron acceptor is reacted with said solid product (I) to form said solid product (II).

8. The improvement according to claim 1 wherein said solid product (I) is reacted with at least one electron donor and then the resulting product is reacted with at least one electron acceptor to form said solid product (II).

9. The improvement according to claim 1 wherein said solid product (I) is reacted with at least one electron donor and then the resulting product is reacted with at least one electron acceptor to form said solid product (II).

10. The improvement according to claim 1 wherein said solid product (I) is reacted with an electron donor ($C_1$) and then the resulting product is reacted with another electron donor ($C_2$) and an electron acceptor to form said solid product (II).

11. The improvement according to claim 1 wherein said solid product (I) is reacted with an electron acceptor ($D_1$) and then the resulting product is reacted with an electron donor and another electron acceptor ($D_2$) to form a solid product (II).

12. The improvement according to claim 1 wherein said solid product (I) is reacted with an electron donor and an electron acceptor ($D_1$) and then the resulting product is reacted with another electron acceptor ($D_2$) to form said solid product (II).

13. The improvement according to claim 1 wherein said solid product (I) is reacted with two kinds of electron donors ($C_1$) and ($C_2$) in the coexistence of these two, and then the resulting product is reacted with an electron acceptor ($D_1$), and then the resulting product is reacted with another electron acceptor ($D_2$) to form said solid product (II).

14. The improvement according to claim 1 wherein said solid product (I) is reacted with an electron donor ($C_1$); the resulting product is reacted with another electron donor ($C_2$); the resulting product is reacted with an electron acceptor ($D_1$); and the resulting product is reacted with another electron acceptor ($D_2$).

15. The improvement according to claim 1 wherein said solid product (I) is reacted with an electron donor ($C_1$); the resulting product is reacted with another electron donor ($C_2$); and the resulting product is reacted with another electron donor ($C_3$) and an electron acceptor (D) to form said solid product (II).

16. The improvement according to claims 12, 13 or 14 wherein silicon tetrachloride is used as said electron acceptor ($D_1$) and subjected to a milling reaction, and titanium tetrachloride is used as said electron acceptor ($D_2$) and subjected to a suspension reaction to form said solid product (II).

* * * * *